(12) United States Patent
Efremov

(10) Patent No.: US 11,544,362 B2
(45) Date of Patent: Jan. 3, 2023

(54) SYSTEM AND METHOD FOR FILTERING USER REQUESTED INFORMATION

(71) Applicant: AO Kaspersky Lab, Moscow (RU)

(72) Inventor: Andrey A. Efremov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 271 days.

(21) Appl. No.: 16/774,728

(22) Filed: Jan. 28, 2020

(65) Prior Publication Data

US 2021/0097163 A1    Apr. 1, 2021

(30) Foreign Application Priority Data

Sep. 30, 2019  (RU) .............................. RU2019130600

(51) Int. Cl.
| | |
|---|---|
| *G06F 21/32* | (2013.01) |
| *G06F 21/44* | (2013.01) |
| *G06F 21/62* | (2013.01) |
| *G10L 17/04* | (2013.01) |
| *G10L 17/06* | (2013.01) |
| *G10L 21/0208* | (2013.01) |

(52) U.S. Cl.
CPC .............. *G06F 21/32* (2013.01); *G06F 21/44* (2013.01); *G06F 21/6245* (2013.01); *G10L 17/04* (2013.01); *G10L 17/06* (2013.01); *G10L 21/0208* (2013.01)

(58) Field of Classification Search
CPC ...... G06F 21/32; G06F 21/44; G06F 21/6245; G10L 17/04; G10L 17/06; G10L 21/0208
USPC ......................................................... 713/186
See application file for complete search history.

(56) References Cited

U.S. PATENT DOCUMENTS 9,104,886 B1 * 8/2015 Dolbakian .............. G06F 21/62
2005/0221840 A1   10/2005 Yamamoto et al.
(Continued)

FOREIGN PATENT DOCUMENTS

WO        2018/199962 A1    11/2018

OTHER PUBLICATIONS

Oriana Riva et al; "Progressive authentication: deciding when to authenticate on mobile phones", Usenix, The Advanced Computing Systems Association, Apr. 11, 2013 (Apr. 11, 2013), pp. 1-16.
(Continued)

*Primary Examiner* — Jacob Lipman
(74) *Attorney, Agent, or Firm* — ArentFox Schiff LLP; Michael Fainberg

(57) ABSTRACT

A method for controlling secure access to user requested data includes retrieving information related to potential unauthorized access to user requested data. The information is collected by a plurality of sensors of user's mobile device. A trained statistical model representing an environment surrounding a user is generated based on the retrieved information. A first data security value is determined using the generated trained statistical model. The first data security value indicates a degree of information security based on user's environment. A second data security value is determined using the generated trained statistical model. The second data security value indicates a degree of confidentiality of the user requested data. The user requested data is filtered based on a ratio of the determined first data security value and the second data security value.

14 Claims, 3 Drawing Sheets

(56) References Cited

U.S. PATENT DOCUMENTS

| | | | |
|---|---|---|---|
| 2008/0181058 A1* | 7/2008 | Hayakawa | G10L 21/0208 367/125 |
| 2011/0161076 A1* | 6/2011 | Davis | H04M 1/72448 704/E15.001 |
| 2014/0189784 A1 | 7/2014 | Marino et al. | |
| 2016/0188902 A1* | 6/2016 | Jin | G06Q 50/01 726/28 |
| 2017/0286715 A1* | 10/2017 | Kaladgi | G06F 21/6245 |
| 2017/0346853 A1* | 11/2017 | Wyatt | H04L 63/1425 |

OTHER PUBLICATIONS

Fischer et al: "Short paper:Smartphones: Not Smart Enough?" Proceedings of the Second ACM Workshop on Security and Privacy in Smartphones and Mobile Devices, SPSM '12, Jan. 1, 2012 (Jan. 1, 2012), p. 27.

\* cited by examiner

SYSTEM AND METHOD FOR FILTERING USER REQUESTED INFORMATION

CROSS-REFERENCE TO RELATED APPLICATION

This application claims benefit of priority under 35 U.S.C. 119(a)-(d) to a Russian Application No. 2019130600 filed on Sep. 30, 2019, which is incorporated by reference herein.

FIELD OF TECHNOLOGY

The present disclosure relates to the field of information security, and, more specifically, to system and method for filtering user requested information carrying a security threat.

BACKGROUND

With the rapid development of computer technologies various electronic devices (such as personal computers) and various portable devices (such as notebooks, tablets, mobile phones, and the like) are now in widespread use. Now, such devices are the major means of communication in business, industry, government and social intercourse. For example, mobile phones provide various functionalities for people, such as short message services, communications, games, calendars, music, etc.

Significant progress in fields such as voice recognition, machine learning, and the like has made it possible to simplify the interaction of a user with computer systems. One of the results of such simplification is the appearance of personal assistants—applications performing tasks (or utilizing services) based on information obtained from the user (verbally or manually), by manual interaction with the personal assistant.

The specific character of the interaction with a personal assistant through voice commands, the access to the requested information through an audio channel (i.e., by voice), and the possibility (and sometimes even the necessity) of using the personal assistant at any given place and time, introduced numerous problems with respect to ensuring the security of the data being transmitted. One solution to these problems involves the complete refusal to use an audio channel for the exchange of data between the user and the personal assistant. However, such limitation significantly lowers the effectiveness and convenience of personal assistants and may often be unacceptable to ordinary users. At present, there exist other solutions which typically limit the interaction between a user and a personal assistant, depending on various external factors.

Although conventional technology solutions handle the tasks of providing users with requested information (or a certain limitation on providing it), these solutions typically do not directly analyze security concerns associated with a provision of the requested information. Accordingly, the conventional technology solutions are not enabled to analyze risks associated with the provision of the requested information and not enabled to mitigate such risks, let alone mitigate such risks depending on dynamically changing user environment.

Thus, there is a need to ensure the security of the information provided to a user in order to lower risks associated with various security threats.

SUMMARY

Aspects of the disclosure relate to ensuring the security of user requested data.

One technical result of the disclosure is the safe provision to a user of the information requested by the user by filtering provided information based on probability of unauthorized access to such information.

In one aspect, a method for controlling secure access to user requested data includes retrieving information related to potential unauthorized access to user requested data, wherein the information is collected by a plurality of sensors of user's mobile device. A trained statistical model representing an environment surrounding a user is generated based on the retrieved information. A first data security value is determined using the generated trained statistical model. The first data security value is indicative of a degree of information security based on user's environment. A second data security value is determined using the generated trained statistical model. The second data security value is indicative of a degree of confidentiality of the user requested data. The user requested data is filtered based on a ratio of the determined first data security value and the second data security value.

In one aspect, the plurality of sensors of the mobile device include at least: a geolocation sensor, an audio sensor, a video sensor, a G-sensor, a velocity sensor, a gyroscope, an accelerometer, a wireless communication adapter.

In one aspect, the retrieved information includes at least audio data characterizing the environment surrounding the user. The audio data includes at least amplitude-frequency characteristics of the audio data, time and space coordinates of one or more sound sources with respect to user's position and a degree of similarity of the one or more sound sources.

In one aspect, the first data security value indicates a probability of an unauthorized user gaining access to the user-requested information. The probability is determined based, at least in part, on loudness of a voice of the user of the mobile device and based, at least in part, on distance between the mobile device and one or more other devices present in a vicinity of the mobile device.

In one aspect, the first data security value ranges from a minimum value to a maximum value. The minimum value indicates a high probability of the user-requested information being obtained solely by the user, and the maximum value indicates a high probability of the user-requested information being obtained by an unauthorized user.

In one aspect, the retrieved information includes at least data characterizing conditions of communication networks surrounding the user. The data characterizing conditions of communication networks includes at least identifiers of one or more wireless networks surrounding the user, signal characteristics of the one or more wireless networks surrounding the user, and a number of devices connected to the one or more wireless networks.

In one aspect, the trained statistical model includes a plurality of parameters describing at least one of: a geolocation of user's mobile device, a plurality of discrete structures disposed substantially around the user's mobile device, the audio data characterizing the environment surrounding the user and a social environment data characterizing a social environment surrounding the user.

In one aspect, the method further includes granting or denying access to the user requested data based on the ratio of the determined first data security value and the second data security value.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for controlling secure access to user requested data. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

A number of definitions and concepts that will be used in describing variant aspects of the present disclosure will now be introduced.

Information security of a user—actions aimed at preventing unauthorized access, use, disclosure, distortion, alteration, examination, recording or destruction of user information. The main task of information security is well-balanced protection of the confidentiality, integrity and availability of data, taking into consideration the suitability of the application without any loss to productivity of the organization.

Filtering of information—actions aimed at clustering of obtained (or intercepted) information, assessment of the formed clusters (for example, the information security of a cluster), and the exclusion of clusters not passing a security test from subsequent transmission of the cluster contained information.

Threat to information security of a user—a condition (for example, a condition of the functioning of a computer system) that can result in unauthorized access, use, disclosure, distortion, alteration, examination, recording or destruction of user information, which in turn can inflict material, financial, or reputational loss (harm) on the user.

Various aspects of the disclosure enable filtering of user-requested information carrying a security threat.

Figure 1:
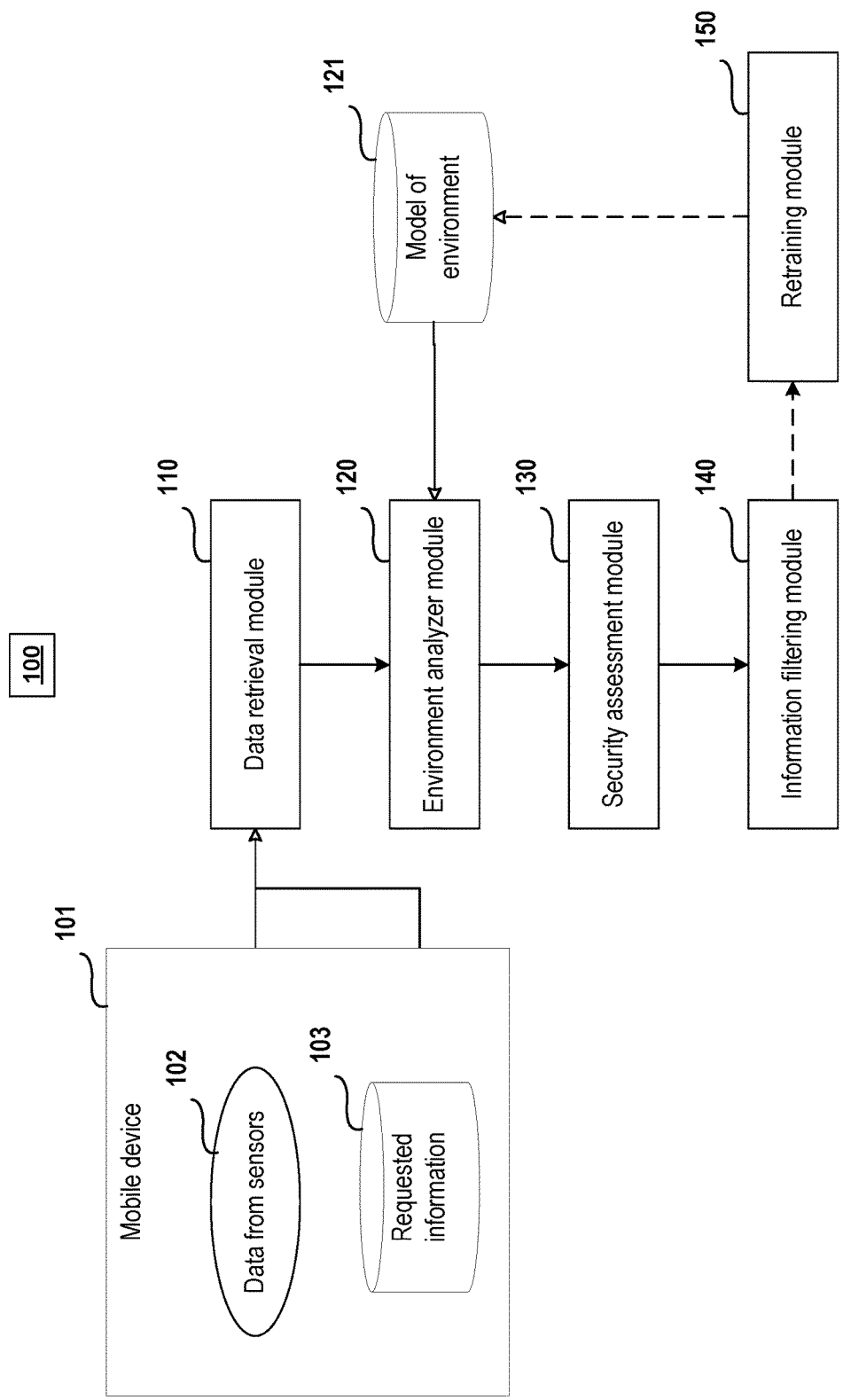
FIG. 1 illustrates the high-level architecture of the system realizing the method for controlling secure access to user-requested information, in accordance with aspects of the present disclosure.

FIG. 1 illustrates the high-level architecture of the system realizing the method for controlling secure access to user-requested information, in accordance with aspects of the present disclosure.

The system realizing the method for controlling secure access to user-requested information may include a mobile device 101 having a plurality of sensors, data from the plurality of sensors of the mobile device 101, the user-requested information 103, a data retrieval module 110, an environment analyzer module 120, a model of the environment 121, a security assessment module 130, an information filtering module 140, and a retraining module 150.

In one aspect, the data retrieval module 110 may be configured to retrieve various data from the plurality of sensors of the mobile device 101, obtain the user requested information 103, and transmit the retrieved information to the environment analyzer module 120.

In one aspect, the mobile device 101 may include a mobile communication device such as a smartphone, a smart watch or a computer (e.g., a tablet, laptop, personal digital assistant, and the like), for example. The mobile device 101 may communicate wirelessly with the data retrieval module 110 and/or other modules of the system. For example, the mobile device 101 may communicate with the data retrieval module 110, the environment analysis module 120, and/or the security assessment module 130 using any suitable wireless communication protocol such as short-range radio wave communication, Wi-Fi, Bluetooth, Bluetooth Low Energy (BLE) and/or Near Field Communication (NFC), for example.

The use of the described technology is not limited to the indicated devices and/or communication protocols and if need be it can be used on any given computing device capable of providing functionality described below (and having one or more sensors).

In one aspect, the plurality of sensors of the mobile device 101 comprise at least:
  geolocation sensors (GPS sensors, GLONASS sensors, sensors for receiving a signal from telephone towers, and so forth);
  an audio sensor;
  a video sensor;
  a sensor detecting the position of the mobile device 101 in space (G-sensor);
  a velocity sensor;
  a gyroscope;
  an accelerometer;
  wireless communication adapters (Wi-Fi adapter, Bluetooth adapter, infrared sensor, and the like).

In one aspect, the sensors may be installed both on the mobile device 101 itself and also situated remotely (including on other mobile devices 101), and the mobile device 101 may get access to the data collected by the plurality of sensors via a previously specified interface.

For example, an audio sensor, such as a microphone, and a video sensor (such as a web camera) as independent devices may be hooked up to the mobile device 101 (rather than being internal parts of the mobile device 101).

In one aspect, the data 102 collected by the plurality of sensors of the mobile device 101 may include, but is not limited to:
  data on the characteristics of sound registered by one or more audio sensors around the mobile device 101 (such as loudness of the sound, the amplitude-frequency characteristics, sound modes, distance to the sound source, and so forth);
  data on other mobile devices located in a vicinity of the mobile device 101;
  geolocation data of the mobile device 101;
  data on the condition of access points and wireless networks, including characteristics of the signal of wireless networks.

In one aspect, the data on the characteristics of sound registered by one or more audio sensors characterizing the environment surrounding a user of the mobile device 101 comprises at least:

the amplitude-frequency characteristics of the audio data (such as the Fourier transform of the data obtained from the microphone of the mobile device 101);

the time and space coordinates of the one or more sound sources with respect to user's position;

the degree of similarity of the sound sources (for example, based on a comparison of the convolutions of the amplitude-frequency characteristics of the audio data) to previously prepared templates of sound sources.

For example, the audio data on the characterizing the environment surrounding a user of the mobile device 101 in a shopping center may be audio data's amplitude-frequency characteristic with highlighted sound modes, which in turn characterizes the position of the source of sound and the distance to the source of sound (for example, 5 m), as well as its identification as human speech on the basis of a comparison of the highlighted modes with previously prepared templates from a database of sound templates (for example, modes at 34 Hz, 152 Hz, 413 Hz).

In one aspect, the data on other mobile devices 102 situated in a vicinity of the mobile device 101 may comprise at least:

the characteristics of sources of Bluetooth and Wi-Fi signals;

the identifiers and coordinates of devices using identical specialized software (such as markers of Google Maps, Yandex Maps, glimpse, tracks from sports training programs with the ability to gather data on geolocation, and so forth).

For example, the data on various mobile devices (such as their geolocation and the likelihood of a mobile device being in a particular position over the course of time) may be obtained by an analysis of markers on a map and the time of their establishment via the social networks, such as, but not limited to, Facebook, Instagram, Samsung Health and so forth.

In one aspect, the data collected by the plurality of sensors may include data characterizing conditions of communication networks surrounding a user. In one aspect, the data characterizing conditions of communication networks may include but is not limited to: the identifiers of the wireless networks (such as a Wi-Fi), the strength and quality of the signal of the corresponding wireless networks, the number of devices connected to said wireless networks, the security characteristics of said networks (for example, the presence of passwords), the speed characteristics of said wireless networks, and the like. The described characteristics may be obtained either directly by querying the corresponding wireless network using an Application Programming Interface (API) (such as an API for exchanging data in the network, an API for access to the parameters of the network equipment, and the like), or by testing the surrounding communication networks using the mobile device 101.

For example, information particular to Wi-Fi networks (such as Home12_5 G, AlexTUT2001, FreeNet1984) may characterize the geographical position of the mobile device 101 within a house. Furthermore, analysis of the signal level of those Wi-Fi networks may provide even better accuracy by narrowing down the geolocation of the mobile device 101 to a particular room in an apartment.

In one aspect, an analysis of the signal level and the designation of wireless networks may characterize other mobile devices in the vicinity of the mobile device 101 (such as Alex75, iPhoneNino15, GalaxyAndroidThomson156).

In one aspect, the environment analyzer module 120 may be configured to:

formulate, on the basis of the data gathered by the plurality of sensors of the mobile device 101, the parameters of a model of the environment 121 of the mobile device 101;

and send the parameters formulated to the security assessment module 130.

In one aspect, the model of the environment 121 comprises an aggregate of data on objects (such as mobile devices, users, building floor plans, positions of access points, and so forth) and properties (such as the vector space of the signal of one or more wireless networks, statistical and temporal data on the change in the properties of various objects in the vicinity of the mobile device 101, and the like). The model of the environment 121 may also include rules for the interaction of the objects in the environment based on the change in properties of that environment.

In one aspect, the model of the environment 121 comprises a trained statistical model, such as, for example, a trained neural net, which may receive at its input the data 102 collected by the plurality of sensors of the mobile device 101. The model of the environment 121 may be configured to provide the output comprising at least:

the degree of information security of the environment (as described in greater detail below in conjunction with the description of the security assessment module 130);

the parameters of the objects of the environment.

In one aspect, the model of the environment 121 comprises an aggregate of parameters describing at least:

the geolocation of the mobile device 101;

the disposition of surrounding structures, elements of structures and elements of the interior disposed substantially around the mobile device 101;

audio data characterizing the environment surrounding the user of the mobile device 101;

social environment data characterizing a social environment surrounding the user of the mobile device 101, including information about the persons situated near the mobile device 101.

As a non-limiting example, the model of the environment 121 may describe a three-dimensional region of space in which the user of the mobile device 101 is situated. The model of environment 121 may match up each element of the environment (such as the volume) and objects located in the vicinity of the mobile device 101 (such as another mobile device, walls, access points, and the like) with various characteristics. Such characteristics may include but are not limited to:

the noise level for sound;

the direction of propagation of sound and the weighting characteristic of sound (describing the level of fading of the sounds depending on the direction of propagation of the sound, and so forth);

the signal levels for surrounding communication networks;

the direction of propagation of the signal and the weighting characteristic of the signal.

Thus, it is possible to generate (by any known method) the complete three-dimensional map of the environment (as an object of the model of the environment 121) around the mobile device 101 representing the disposition of substantially all objects in the environment necessary for further analysis. More specifically, such objects may include a plurality of objects influencing in some way the level of security of information being transmitted from/to the mobile device 101.

In one aspect, the model of the environment 121 may be pregenerated in advance (for example, by an analyst). Such pregenerated model of the surrounding 121 may be used by providing the starting parameters that could be obtained using the aforementioned methods.

For example, a user of the mobile device 101, may enter a shopping center, and may be presented with (by any method known in the art, for example, with the help of the means of a personal assistant) a model of that shopping center with specified access points, the characteristics of sound propagation, "dead" zones, and so forth. In this case, the environment analyzer module 120 may correct (if necessary) information contained in the model of the environment 121 based on the data 102 gathered from the plurality of sensors In addition, the environment analyzer module 120 may supplement the model of the environment 121 with new objects (for example, other mobile devices), and may provide a probability that one or more users of mobile devices are located near the user of the mobile device 101 or the IoT devices. The environment analyzer module 120 may correct the existing elements of the model of the environment 121 (such as the signal level of the access points).

In one aspect, the model of the environment 121 may be generated entirely by the environment analyzer module 120.

For example, on the basis of data 102 collected by the plurality of sensors, the environment analyzer module 120 may determine the distribution of other users around the user of the mobile device 101, the structure of the environment (the presence and disposition of walls, statistical data on the congregation of people, and so forth) may be determined by analyzing the dynamics of movement of various objects within the analyzed environment (for example, based on the change in signal level of other mobile devices or the level of sounds emitted by people), and may generate the corresponding model of the environment 121 based on such determinations. The security assessment module 130 may be configured to:

- determine, using the model of the environment 121 and the parameters formulated, a numeric value indicative of the degree of information security of the environment;
- determine a numeric value indicative of the degree of confidentiality of the user-requested information 103;
- and send the determined values to the information filtering module 140.

In one aspect, the degree of information security of the environment indicates the probability of an unauthorized user obtaining access to the user-requested information 103.

For example, the probability of an unauthorized user gaining access to the user-requested information 103 can be calculated by the security assessment module 140 using one of the following methods:

the probability of an unauthorized user gaining access to the user-requested information $\xi_{threat}$ may be determined as a function directly dependent on the loudness level of the voice of the user of the mobile device 101 (denoted here as $A_{src}$) requesting the information 103, and inversely dependent on the distance to other mobile devices denoted here as $L_{dst}$ $$\xi_{threat} \sim \frac{A_{src}}{L_{dst}};$$

the probability of an unauthorized user gaining access to the user-requested information $\xi_{threat}\xi_{threat}$ may be determined using statistical data (analysis) as a function inversely dependent on the time elapsed from the time of the analysis performed:

$$\xi_{threatcurrent} \sim \frac{\xi_{threatlast}}{t_{current} - t_{last}},$$

where
- $t_{current}$—the time stamp for performing the current analysis,
- $t_{last}$—the time stamp for performing the last analysis,
- $\xi_{threat\ current}$—the desired probability for the current analysis,
- $\xi_{threat\ last}$—the desired probability for the last analysis.

In one aspect, the degree of information security of the environment is a numerical data security value, ranging from the minimum value (indicating a high probability of the user-requested information 103 being obtained solely by that user) to the maximum value (indicating a high probability of the user-requested information 103 being obtained by an unauthorized user).

For example, when working with a personal assistant (when the user issues search requests by voice, and the personal assistant announces the obtained search findings), the values of the degree of information security denoted herein as ksecurity~$\xi_{threat}$ may be in the range of 0 to 1. In this example, the security assessment module 140 may determine that the degree of information security has minimum value (indicating the user-requested information 103 will be obtained solely by the user) if no other mobile device is discovered in a radius of, for example, 10 m from the mobile device 101 and no information has been obtained with respect to other people situated in the same region of space In other words, value of 0 indicates that the user-requested information 103 will only be accessible to the intended authorized user and unauthorized people/devices will not get access to this information. On the other hand, the security assessment module 130 may determine that the degree of information security has the maximum value of 1 (indicating the user-requested information 103 will be accessible to other people or will be registered by other mobile devices) if, for example, other mobile devices have been detected at a distance of 1 m from the mobile device 101.

In one aspect, the second data security value, namely the degree of confidentiality of the information, characterizes the probability that the divulging the user-requested information 103 is a danger to the information security of the user (for example, carries a threat of material or financial nature).

In one aspect, the user-requested information 103 constituting a danger to the user may include at least:
- the bank details of the user;
- personal information of the user;
- information of national, religious, political or sexual (adult) nature;
- information on the geolocation of the user.

For example, such confidential information may include credit card numbers and the CSVs for them, logins and passwords for access to mail boxes and accounts in social networks, information on search queries (for example, on sites for adults), information on the user's bookings (for example, at transportation companies, airline companies, and so forth).

In one aspect, different types of user-requested information may be assigned a weighting factor value which may affect the determination of the degree of confidentiality of the information value.

For example, the bank details of the user (such as a credit card number) may be assigned a weighting factor of 1.0, while information on the addresses of the nearest pizzerias, in one of which the user wishes to make a purchase, may be assigned a weighting factor of 0.1. In the second case, the value of 0.1 indicates that this information most often does not carry a threat to the user, yet the possession of such information makes it possible to track the movement of the user. Thus, the contribution of the weighting factor for bank details to the degree of confidentiality being computed will be much greater than the contribution of the requested addresses of the pizzerias.

In one aspect, the degree of confidentiality of the information may be determined based on at least:
lexical analysis of the user's request;
functional analysis of the user-requested information 103.

In one aspect, previously determined templates with information having a certain degree of confidentiality (for example, as determined by analysts) is additionally involved in the analysis of the user's request or the user-requested information.

For example, the analysis may utilize a previously created database of key words and expressions, each of which is assigned its own weighting factor that affects the resulting degree of confidentiality. A simplified example of such database is shown below:

| "credit card" | 1.0 |
| "password" | 0.8 |
| "secret" | 0.7 |

In one aspect, the security assessment module 130 performing the analysis of the user's request and the user-requested information 103 may use a model of lexical analysis previously trained by any known method of machine learning, for example.

In one aspect, during the lexical analysis of the user's request, the security assessment module 130 may perform a search to pick out key words and phrases, where each word or phrase is assigned a certain weighting factor characterizing the corresponding word or phrase.

In one aspect, the degree of confidentiality of the user-requested information 103 may be determined based on at least:
information on the source for obtaining of the user-requested information 103 (for example, information on the site from which the user-requested information 103 is obtained);
the size and type of the user-requested information 103 (for example, electronic documents or images);
the presence in the user-requested information of key words and phrases, media data, and so forth.

For example, the degree of confidentiality of the user-requested information 103 may be affected by the site from which that information was obtained (such as, a bank site) or the presence of images contained in the user-requested information 103.

In other words, the degree of confidentiality of the user-requested information 103 is a numerical value ranging from a minimum value to a maximum value. In one aspect, the minimum value indicates that the user-requested information 103 is not likely to carry a danger to the security of the user requesting it, and the maximum value indicates that the user-requested information 103 is very likely to inflict a loss on the information security of the user.

For example, the degree of confidentiality of the user-requested information 103 may be in the range of 0 to 1. In one aspect, the degree of confidentiality value of 0 may indicate that the disclosure of the user-requested information 103 does not constitute a threat to the information security of the user. The degree of confidentiality value of 1 may indicate that the disclosure of the user-requested information 103 is highly likely to cause some kind of loss to the user. For example, the disclosure of bank details (credit card numbers and CSVs) is able to inflict material (financial) loss on the user, and therefore such information is assigned the maximum degree of confidentiality, while the disclosure of information on movie premieres at movie theaters or news items is practically unable to cause material or other loss to the user and therefore this information is assigned the minimum degree of confidentiality.

In one aspect, the security assessment module 130 may determine values of the degree of information security and the degree of confidentiality of the information using a known machine learning method for the model for determining the degrees which has been trained by any method known in the art. That model may be further trained or retrained during the use of the technology described, depending on the feedback obtained from the user as to the filtering of the user-requested information 103 (as described below). The further training or retraining of the model for determining the degrees may be performed in such a way that the obtained feedback from the user meets given requirements (for example, a minimum number of refusals to obtain the filtered information and repeat requests to obtain complete information).

The information filtering module 140 may be configured to filter the user-requested information 103 depending on the ratio of the degree of information security of the environment and the degree of confidentiality of the information.

In one aspect, the information filtering module 140 may further be configured to grant or deny access to the user requested information 103 based on the assessed security threat. In one example, the information filtering module 140 may grant access to the user-requested information if the degree of information security of the environment is greater than the degree of confidentiality of the information.

For example, if a user tries to grant access to information on the bank details in the bustling lobby of a shopping center (where many mobile devices have been detected, the noise level characterizing the number of people in a 10-meter zone from the user is over 10), and the security assessment module 130 determines that the degree of information security of the environment(kthreat) is equal to 0.972 and the degree of confidentiality of information (ksecurity) is equal to 0.926, the information filtering module 140 may deny user access. In this case, the security assessment module 130 may deny access since kthreat>ksecurity, because providing the requested information may carry a threat to his/her information and material security.

In one aspect, the information filtering module 140 may utilize a table of previously established information granting decisions based on the degree of information security of the environment and the degree of confidentiality of the information. In one aspect, such table may comprise a binary table in the form of [kthreat, ksecurity]={false, true}

For example, on the basis of previously analyzed cases of user-requested information and locations where users requested the information (public and private transport, open and closed premises, private apartments, office buildings, shopping centers, and so forth), analysts (including with the aid of automatic means) may formulate tables by which, given the values of the corresponding degrees of information security of the environment and confidentiality of the information, the information filtering module 140 may determine whether it is safe to provide the requested information or not. For example, a table in which, for all values [kthreat, ksecurity], where $(2.75-kthreat) \times (1.18-ksecurity) > 0.25$, a ban may be established on granting the user's request for information.

In one aspect, the information filtering module 140 may perform the filtering and provide access to information based on at least the following rule where:
- the user-requested information 103 is provided in full if the ratio of the degree of information security of the environment and the degree of confidentiality of the information is greater than a predetermined threshold value (hereinafter, the minimum security limit);
- the user-requested information 103 is not provided if the ratio of the degree of information security of the environment and the degree of confidentiality of the information is less than a predetermined threshold value (hereinafter, the maximum risk limit);
- the user-requested information 103 is selected on the basis of predetermined selection rules if the ratio of the degree of information security of the environment and the degree of confidentiality of the information lies in the range bounded by the minimum security limit and the maximum risk limit.

For example, if the user has requested bank details, the status of accounts, and the addresses of the nearest banks, after performing an analysis on the safety of providing such information to the user, the information filtering module 140 may make a decision to only provide information on the addresses of banks to the user.

In one aspect, the filtering of the user-requested information 103 performed by the information filtering module 140 may involve at least:
- restricting the information being provided using any method for providing information (for example, audio and video methods of sending information, sending information with the aid of printed matter, and so forth);
- restricting the methods of providing information (for example, replacing the audio method of sending information by the video method, and so forth);
- changing the characteristics of the corresponding methods of sending information (for example, changing the loudness of the sound in the case of an audio method of sending information).

For example, in the case of a user requesting information on the nearest entertainment locations for adults, the information filtering module 140 may decide to provide such information not via voice message, but using an image on the screen of the user's mobile device 101.

In one aspect, in the case where a decision is made to deny access to the user-requested information 103, the information may be provided to the user afterwards by the information filtering module 140, in event of changes in conditions adversely affecting the filtering of that sensitive information.

For example, if a user has requested information on his/her bank accounts (i.e., the availability of funds in the accounts, the recent fund transfers, fund sources, and so forth) while using public transportation, the information filtering module 140 may originally decide to restrict access to this information but may grant it later once user's surrounding environment changes and the user leaves public transportation.

The retraining module 150 may be configured to:
- obtain feedback from the user with respect to the provision of the filtered information;
- retrain the model of the environment 121 based on user's feedback such that the feedback on the provision of the user-requested information, filtered on the basis of the aforementioned analysis using the same data 102 from the sensors of the mobile device 101, is positive.

In one aspect, the feedback may include at least:
- a request of the user to provide more complete information than the filtered information provided;
- a request of the user to cancel the providing of the filtered information (for example, because that information is superfluous or inappropriate to the given situation in the opinion of the user);
- a confirmation of the receipt of the filtered information by the user.

In one aspect, the feedback may be considered to be negative if the user was not satisfied with the filtered information provided.

For example, if after sending the filtered requested information 103 to the user, the user again makes a similar request, such an action may be considered negative feedback.

In yet another example, the user may interrupt the output of the filtered requested information 103 (including by such methods as muting the sound of the mobile device 101 at the moment of output of audio information or shutting off the screen at the moment of output of video information), such actions may also be considered as negative feedback.

In one aspect, the user may need to undergo a supplemental authorization (for example, by SMS notification, response to a secret question, or supplemental biometric identification) in order to obtain additional information (which was previously filtered).

In addition, the retraining module 150 may be configured to repeat training of at least:
- the model for determination of degrees;
- the lexical analysis model.

Any above-described retraining of the models used has the goal of reducing the amount of negative feedback from the user. In other words, the main objective of the retraining is to increase the predictive power and the correctness of the system.

Figure 2:
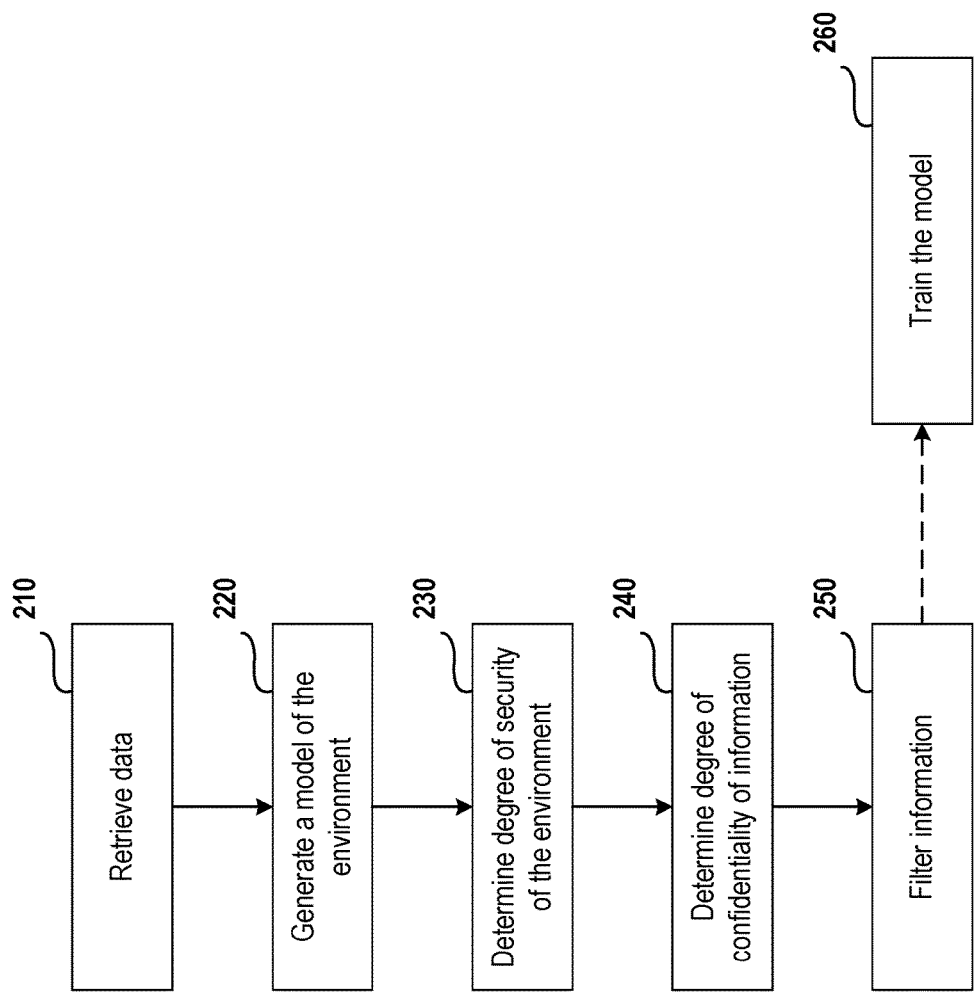
FIG. 2 illustrates a flow diagram of the method for controlling secure access to user-requested information, in accordance with aspects of the present disclosure.

FIG. 2 illustrates a flow diagram of the method for controlling secure access to user-requested information, in accordance with aspects of the present disclosure.

The disclosed method includes step 210, in which data collected by the plurality of sensors of the mobile device 101 is retrieved by the data retrieval module 110, as described above.

At step 220, the environment analyzer module 120 generates a trained statistical model, such as the model of the environment 121, based on the data retrieved by the data retrieval module 110, as described above.

At step 230, the security assessment module 130 utilizes the model of the environment 121 and the parameters formulated in step 220 to determine the first data security value indicative of the degree of information security of the user's environment, as described above.

At step 240, the security assessment module 130 determines the second data security value indicative of the degree of confidentiality of the user-requested information 103, as described above.

At step 250, the information filtering module 140 filters the user-requested information 103 based at least on the ratio of the first and second data security values indicative of the environment and the degree of confidentiality of the information, respectively.

At step 260, the retraining module 150 may obtain feedback from the user on the provision of the filtered information. In response to receiving negative feedback, the retraining module 150 may retrain the model of the environment 121 such that the feedback on the provision of the user-requested information is positive.

Figure 3:
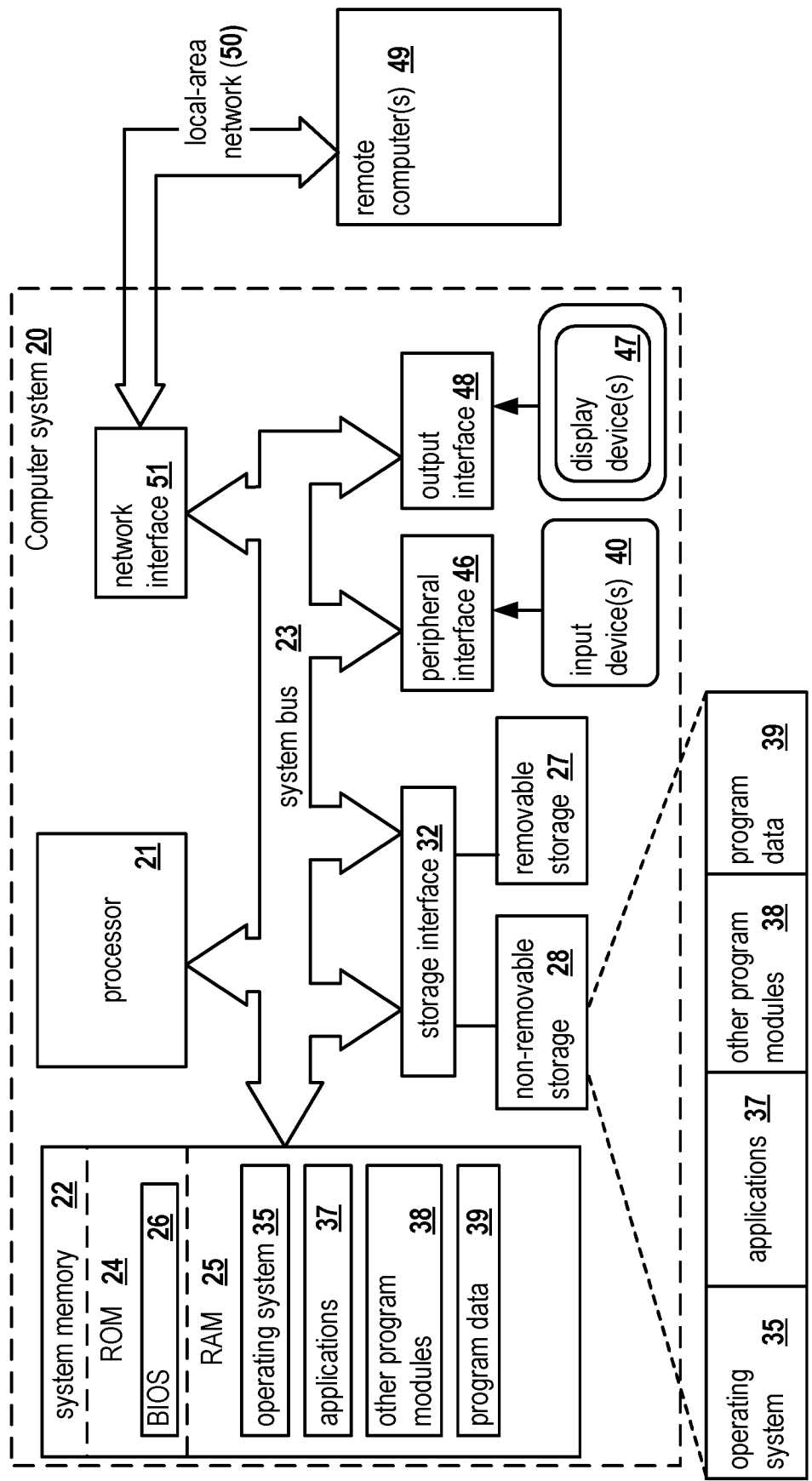
FIG. 3 presents an example of a general-purpose computer system, a personal computer or a server, in accordance with aspects of the present disclosure.

FIG. 3 is a block diagram illustrating a computer system 20 on which aspects of systems and methods for controlling secure access to user-requested information may be implemented in accordance with an exemplary aspect. The computer system 20 may represent computer system 100 from FIG. 1 and can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I2C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for controlling secure access to user requested data, the method comprising:
   retrieving information related to potential unauthorized access to user requested data, wherein the information is collected by a plurality of sensors of user's mobile device, wherein the retrieved information includes at least audio data characterizing an environment surrounding a user and wherein the audio data includes at least i) amplitude-frequency characteristics of the audio data with highlighted sound modes and ii) a degree of similarity of the one or more sound sources calculated by comparing the highlighted sound modes of the amplitude-frequency characteristics of the audio data to previously prepared templates of sound sources;
   generating, based on the retrieved information, a trained statistical model representing the environment surrounding the user, wherein the trained statistical model comprises a plurality of parameters describing at least one of: a plurality of discrete structures disposed substantially around the user's mobile device and a social environment data characterizing a social environment surrounding the user;
   determining, based on the generated trained statistical model, a first data security value indicating a degree of information security based on user's environment, wherein the first data security value ranges from a minimum value to a maximum value, wherein the minimum value indicates a high probability of the user requested data being obtained solely by the user and the maximum value indicates a high probability of the user requested data being obtained by the user and by an unauthorized user;
   determining, based on the generated trained statistical model, a second data security value indicating a degree of confidentiality of the user requested data; and
   filtering the user requested data based on a ratio of the determined first data security value and the second data security value.

2. The method of claim 1, wherein the plurality of sensors of users mobile device comprise: a geolocation sensor, an audio sensor, a video sensor, a G-sensor, a velocity sensor, a gyroscope, an accelerometer, a wireless communication adapter.

3. The method of claim 1, wherein the retrieved information includes at least data characterizing conditions of communication networks surrounding the user and wherein the data characterizing conditions of communication networks includes at least identifiers of one or more wireless networks surrounding the user, signal characteristics of the one or more wireless networks surrounding the user, and a number of devices connected to the one or more wireless networks.

4. The method of claim 1, wherein the plurality of parameters describe at least one of: a geolocation of user's mobile device and the audio data characterizing the environment surrounding the user.

5. The method of claim 1, wherein the first data security value indicates a probability of the authorized user gaining access to the user requested data and wherein the probability is determined based, at least in part, on i) loudness of a voice of the user of the mobile device and ii) distance between the mobile device and one or more other devices present in a vicinity of the mobile device.

6. The method of claim 1, further comprising granting or denying access to the user requested data based on the ratio of the determined first data security value and the second data security value.

7. A system for controlling secure access to user requested data, the system comprising:
a hardware processor configured to:
retrieve information related to potential unauthorized access to user requested data, wherein the information is collected by a plurality of sensors of user's mobile device, wherein the retrieved information includes at least audio data characterizing an environment surrounding a user and wherein the audio data includes at least i) amplitude-frequency characteristics of the audio data with highlighted sound modes and ii) a degree of similarity of the one or more sound sources calculated by comparing the highlighted sound modes of the amplitude-frequency characteristics of the audio data to previously prepared templates of sound sources;
generate, based on the retrieved information, a trained statistical model representing the environment surrounding the user, wherein the trained statistical model comprises a plurality of parameters describing at least one of: a plurality of discrete structures disposed substantially around the user's mobile device and a social environment data characterizing a social environment surrounding the user;
determine, based on the generated trained statistical model, a first data security value indicating of a degree of information security based on user's environment, wherein the first data security value ranges from a minimum value to a maximum value, wherein the minimum value indicates a high probability of the user requested data being obtained solely by the user and the maximum value indicates a high probability of the user requested data being obtained by the user and by an unauthorized user;
determine, based on the generated trained statistical model, a second data security value indicating of a degree of confidentiality of the user requested data; and
filter the user requested data based on a ratio of the determined first data security value and the second data security value.

8. The system of claim 7, wherein the plurality of sensors of user's mobile device comprise: a geolocation sensor, an audio sensor, a video sensor, a G-sensor, a velocity sensor, a gyroscope, an accelerometer, a wireless communication adapter.

9. The system of claim 7, wherein the retrieved information includes at least data characterizing conditions of communication networks surrounding the user and wherein the data characterizing conditions of communication networks includes at least identifiers of one or more wireless networks surrounding the user, signal characteristics of the one or more wireless networks surrounding the user, and a number of devices connected to the one or more wireless networks.

10. The system of claim 7, wherein the plurality of parameters describe at least one of: a geolocation of user's mobile device, and the audio data characterizing the environment surrounding the user.

11. The system of claim 7, wherein the first data security value indicates a probability of the authorized user gaining access to the user requested data and wherein the probability is determined based, at least in part, on i) loudness of a voice of the user of the mobile device and ii) distance between the mobile device and one or more other devices present in a vicinity of the mobile device.

12. The system of claim 11, wherein the hardware processor is further configured to grant or deny access to the user requested data based on the ratio of the determined first data security value and the second data security value.

13. A non-transitory computer readable medium storing thereon computer executable instructions for controlling secure access to user requested data, including instructions for:
retrieving information related to potential unauthorized access to user requested data, wherein the information is collected by a plurality of sensors of user's mobile device, wherein the retrieved information includes at least audio data characterizing an environment surrounding a user and wherein the audio data includes at least i) amplitude-frequency characteristics of the audio data with highlighted sound modes and ii) a degree of similarity of the one or more sound sources calculated by comparing the highlighted sound modes of the amplitude-frequency characteristics of the audio data to previously prepared templates of sound sources;
generating, based on the retrieved information, a trained statistical model representing the environment surrounding the user, wherein the trained statistical model comprises a plurality of parameters describing at least one of a plurality of discrete structures disposed substantially around the user's mobile device and a social environment data characterizing a social environment surrounding the user;
determining, based on the generated trained statistical model, a first data security value indicating a degree of information security based on user's environment, wherein the first data security value ranges from a minimum value to a maximum value, wherein the minimum value indicates a high probability of the user requested data being obtained solely by the user and the maximum value indicates a high probability of the user requested data being obtained by the user and by an unauthorized user;
determining, based on the generated trained statistical model, a second data security value indicating a degree of confidentiality of the user requested data; and
filtering the user requested data based on a ratio of the determined first data security value and the second data security value.

14. The non-transitory computer readable medium of claim 13, wherein the plurality of sensors of user's mobile device comprise: a geolocation sensor, an audio sensor, a video sensor, a G-sensor, a velocity sensor, a gyroscope, an accelerometer, a wireless communication adapter.

* * * * *